United States Patent Office 3,240,379
Patented Mar. 15, 1966

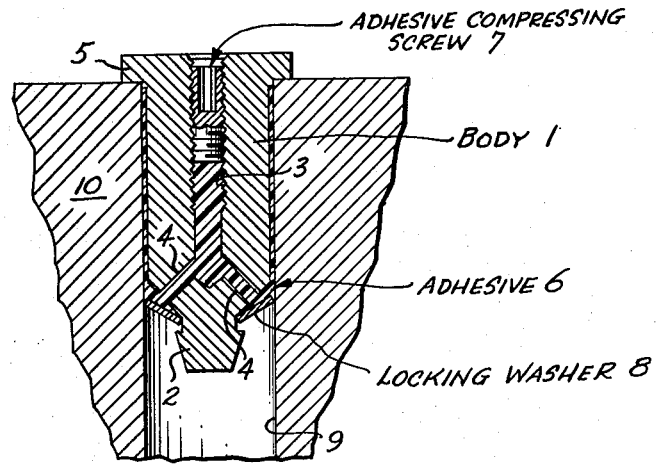
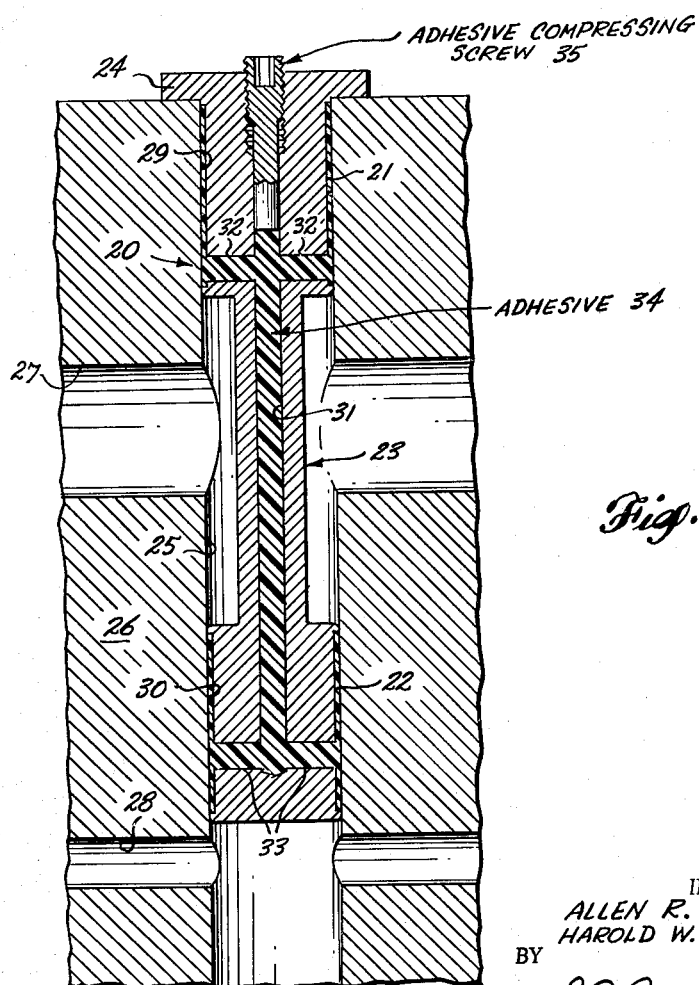

3,240,379
ADHESIVE PASSAGE PLUGS
Allen R. Bremer and Harold W. Hallesy, Seattle, Wash., assignors to The Boeing Company, Seattle, Wash., a corporation of Delaware
Filed Mar. 18, 1964, Ser. No. 352,820
12 Claims. (Cl. 220—24.5)

This invention relates to plugs for machined holes and passages, and more particularly to plugs for components of high pressure hydraulic systems which utilize an adhesive for fixing the plugs in the holes or passages.

Almost all components in present day hydraulic systems contain an internal network of machined holes and passages which are drilled from the outside of the component and require capping or plugging before the component can be become operable.

Pipe threaded holes and plugs, straight threaded boss plugs with gaskets, pressed in dowel pins, and expanding metal plugs have been previously used to plug or cap the drilled passages. Pipe threaded holes and plugs have not been very satisfactory due to (1) the large space taken by the plug, (2) a leakage path which exists in the threads, and (3) the high expansion stresses that can be built up in the component by overtightening the plug. Straight threaded boss plugs are also large and contain a gasket which is sensitive to squeeze and can be nibbled away by pressure impulses. Pressed in dowel pins require close tolerance reamed holes and dowels, and a large compressive force is required to press the dowel in place and when in place a high loop tension stress is built up in the area adjacent to the hole in which the dowel is installed. The expansion plug requires reamed holes and also builds up high hoop tension stresses in the area adjacent to the hole in which the plug is installed.

Applicants have overcome the disadvantages of the prior known plugs by providing a simple adhesive plug which will fit into the machined passage with a nominal clearance and will be held fast in this position by the adhesive. In addition applicants have provided a novel approach to sealing or dividing two passages with one plug. Also, applicants have provided a novel position locking device which may be used in conjunction with the above mentioned plugs.

Therefore, it is an object of this invention to provide a plug for machined holes and passages.

A further object of the invention is to provide a plug for machined holes and passages which utilizes an adhesive for sealing and retaining the plug.

Another object of the invention is to provide an adhesive fixed plug which will exceed the burst pressure of associated hydraulic components.

Another object of the invention is to provide an adhesive fixed plug which does not create high stresses in adjacent parts.

Another object of the invention is to provide an adhesive plug for sealing or dividing plural passages.

Another object of the invention is to provide a plug having simultaneous adhesive extrusion and plug end expansion.

Other objects of the invention will become readily apparent from the following description and drawings wherein:

FIG. 1 is a cross-sectional view of an embodiment of the invention; and

FIG. 2 is a cross-sectional view of an embodiment of the invention for sealing or dividing two passages with a single plug.

Referring to FIG. 1, the plug consists of a body 1 having a reduced diameter arrowhead-like end portion 2, body 1 being provided with a bore 3 extending partially therethrough and with a plurality of passages 4 extending between bore 3 and external area adjacent arrowhead portion 2. Body 1 is also provided with a flange portion 5. An adhesive 6, the details thereof being described hereinafter, is shown in passages 4 and the inner portion of bore 3. Operatively mounted in bore 3 of body 1 is an adhesive compressing screw 7, screw 7 in this embodiment being of the Allen head type. A mechanical positive locking means such as a Belleville-type locking washer 8 is positioned around the neck of arrowhead end portion 2 the periphery of which abuts against the wall of passage 9 in structure 10 within which the plug is located. Locking washer 8 may be constructed of stainless steel or as an assist in installation may be of bimetallic material.

In the installation of the plug shown in FIG. 1, the locking washer 8 is forced over the arrowhead portion 2 of body 1, thus providing a slight interference between the outside diameter (O.D.) of the Belleville-type locking washer and the passage 9 in structure 10. When body 1 is inserted into passage 9 the locking washer 8 prevents outward motion of the plug. With the plug in place in passage 9 adhesive compression screw 7 is turned in forcing adhesive 6 into the cavity on the back side of the locking washer 8 and up the sides of passage 9 filling the clearance gap between body 1 and the wall of the passage. When the adhesive 6 sets (cures) it holds the locking washer 8 in its locked position, seals potential leak passages on the O.D. and I.D. of the locking washer as well as contributing enough strength to firmly hold the plug in passage 9 without the locking washer 8. The positive locking washer 8 is also used to overcome detrimental side effects of adhesives, i.e. creep and loss of shear and tensile strength with temperature.

The adhesive 6 utilized is dependent on the plug design, adhesive cure time, durability and resistance to various associated fluids such as hydraulic fluids, and environmental conditions. The adhesives contemplated are epoxy base resins modified with an elastomer, with an aluminum powder filler and a curing agent, for example, Minnesota Mining and Manufacturing Company adhesives EC 1386, EC 1469, EC 2214 and EC 2258, or the Shell Chemical Company adhesive under the trade name of Epon Adhesive 929. Other types of adhesives may be utilized to satisfy the specific requirements of a particular installation.

Referring now to FIG. 2, the plug indicated generally at 20 consists of a body having end portions 21 and 22 interconnected by a reduced diameter portion 23, end portion 21 being provided with a flange 24 when plug 20 is inserted into passage 25 in structure 26. As shown, passage 25 interconnects with passages 27, and 28 reduced diameter portion 23 of plug 20 being adjacent the interconnection of passages 25 and 27. Each of body end portions 21 and 22 are provided with a reduced diameter area intermediate the ends thereof to define cavities 29 and 30 between said end portions and the wall of passage 25.

Plug 20 is provided with an internal bore 31 which extends through body portions 21 and 23 and part way through portion 22. Passages 32 interconnect the cavity 29 of end portion 21 with bore 31 while passages 33 interconnect cavity 30 of end portion 22 with the bore 31. As shown, the passages 32 and 33 and the majority of bore 31 is filled with adhesive 34 of the type described above. Operatively positioned in body end portion 21 and bore 31 and abutting adhesive 34 is an adhesive compression screw 35, again of the Allen head type.

In installation of the FIG. 2 embodiment, plug 20 is inserted into passage 25 as shown, with reduced diameter body portion 23 extending across the interconnection between passages 25 and 27. Actuation of adhesive compression screw 35, simultaneously forces adhesive 34 through passages 32 and 33 into cavities 29 and 30. Thus, when adhesive 34 cures, the end portion 22 of the plug forms a dam between passages 27 and 28 while the end portion 21 forms a cap for passage 25.

It has thus been shown that the invention provides a plug which (1) fits into machined or other passages with a nominal clearance, (2) will be held fast in the passage by adhesive, (3) will not create high stresses in adjacent parts and dimensional tolerances will be well within the range of conventional drilled holes, (4) will exceed the burst pressures of existing hydraulic components, and (5) will divide or seal internal passages while capping an external passage.

Although particular embodiments of the invention have been illustrated and described, it will be obvious to those skilled in the art that various changes and modifications may be made without departing from the invention, and it is intended to cover in the appended claims all such changes and modifications that come within the true spirit and scope of the invention.

What we claim is:

1. A device for sealing passages comprising a body adapted to be inserted into a passage, said body including a reduced diameter portion, a bore extending substantially through said body, a plurality of passageways extending from the exterior of said body to said bore, adhesive material within at least said bore, and means operatively connected with said bore for forcing said adhesive material from said bore through said passageways to form a seal between the exterior of said body and the wall of an associated passage.

2. The device defined in claim 1 wherein said body is provided with a flange at one end thereof.

3. The device defined in claim 1 wherein said passageways extend from said bore to said reduced diameter portion of said body.

4. The device defined in claim 3 including locking means positioned around said reduced diameter portion of said body.

5. The device defined in claim 4 wherein said body is provided with a flange at one end thereof.

6. The device defined in claim 1 wherein said reduced diameter portion is located intermediate end portions of said body, and wherein said passageways extend from said bore to the exterior of said body through said end portions.

7. The device defined in claim 6 wherein each of said end portions of said body is provided with a reduced diameter section to provide a cavity between said end portions and the wall of an associated passage when said body is inserted therein.

8. The device defined in claim 7 wherein one of said end portions is provided with a flange.

9. A device for plugging or capping a passage comprising a body having a reduced diameter portion at one end thereof, a locking means positioned around said reduced diameter body portion and having an outside diameter which is normally greater than the diameter of an associated passage, a bore extending substantially through said body, a plurality of passageways extending from said bore to said reduced diameter portion, adhesive located in at least said bore, and means operatively connected with said bore for forcing said adhesive from said bore, whereby upon insertion of said body into an associated passage said locking means provides a mechanical lock between said body and the wall of the associated passage and actuation of said adhesive forcing means forces said adhesive through said passageways to provide a bond and a seal between said body and the wall of the associated passage.

10. The device defined in claim 9 wherein said body is provided with a flange at the other end thereof.

11. A device for sealing or capping one or more passages comprising a body having end portions and a reduced diameter intermediate portion, each of said end portions including a reduced diameter section, a bore extending substantially through said body, each of said end portions being provided with a plurality of passageways extending from said bore to the reduced diameter section thereof, adhesive located in at least said bore, and means for forcing said adhesive from said bore through said passageways into said reduced diameter sections of said end portions, whereby upon insertion of said body into an associated passage and actuation of said means said adhesive provides a seal between said body and the wall of the associated passage and additionally fixes said body within the associated passage.

12. The device defined in claim 11 wherein one of said end portions is provided with a flange.

References Cited by the Examiner
UNITED STATES PATENTS 2,481,013    9/1949    Henderson _____ 220—24.5
2,934,806    5/1960    Taylor _____ 220—24.5

THERON E. CONDON, *Primary Examiner.*

G. T. HALL, *Assistant Examiner.*